United States Patent [19]

Makino et al.

[11] Patent Number: 4,718,921
[45] Date of Patent: Jan. 12, 1988

[54] METHOD FOR REMOVING WATER VAPOR FROM WATER VAPOR-CONTAINING GAS

[75] Inventors: Hiroshi Makino; Kanji Nakagawa, both of Ube, Japan

[73] Assignee: UBE Industries, Ltd., Yamaguchi, Japan

[21] Appl. No.: 918,006

[22] Filed: Oct. 10, 1986

[51] Int. Cl.$^4$ .............................................. B01D 53/22
[52] U.S. Cl. ................................................ 55/16; 55/68
[58] Field of Search ................................ 55/16, 68, 158

[56] References Cited

U.S. PATENT DOCUMENTS

| | | | |
|---|---|---|---|
| Re. 30,351 | 7/1980 | Hoehn et al. | 55/16 |
| 3,442,002 | 5/1969 | Geary, Jr. et al. | 55/158 X |
| 3,661,724 | 5/1972 | Strickler | 55/16 X |
| 3,735,558 | 5/1973 | Skarstrom et al. | 55/16 |
| 3,735,559 | 5/1973 | Salemme | 55/16 |
| 3,822,202 | 7/1974 | Hoehn | 55/16 |
| 4,031,012 | 6/1977 | Gics | 55/158 X |
| 4,378,400 | 3/1983 | Makino et al. | 55/16 X |
| 4,440,643 | 4/1984 | Makino et al. | 55/158 X |
| 4,497,640 | 2/1985 | Fournié et al. | 55/16 |
| 4,528,004 | 7/1985 | Makino et al. | 55/16 X |

FOREIGN PATENT DOCUMENTS

| | | | |
|---|---|---|---|
| 159783 | 10/1985 | European Pat. Off. | 55/16 |
| 2047359 | 5/1972 | Fed. Rep. of Germany | 55/16 |
| 152679 | 12/1979 | Japan | 55/16 |
| 2098994 | 10/1982 | United Kingdom | 55/16 |
| 2139110 | 11/1984 | United Kingdom | 55/16 |

Primary Examiner—Robert Spitzer
Attorney, Agent, or Firm—Burgess, Ryan & Wayne

[57] ABSTRACT

A water vapor-containing gas is separated to a fraction thereof having an increased content of water vapor and a remaining fraction thereof having a decreased content of water vapor by a gas separating device which has at least one gas separating membrane having gas feed and delivery surfaces and a ratio $P_{H_2O}/P_{CH_4}$ of water vapor-permeating rate $P_{H_2O}$ to methane gas permeating rate $P_{CH_4}$ of 200 or more, and preferably, made by an aromatic imide polymer, in such a manner that (1) a water vapor-containing feed gas is fed to a feed side of the gas separating device; (2) the feed gas is flowed along the gas feed surface of the gas separating membrane to allow a fraction of the feed gas to permeate through the gas separating membrane; (3) a drying gas containing 300 ppm or less of water vapor is fed to a delivery side of the gas separating device; (4) the fed drying gas is flowed along the delivery surface of the gas separating membrane to promote the permeation of water vapor through the gas separating membrane; (5) the permeated gas fraction is collected together with the flowed drying gas at the delivery side of the gas separating device; and (6) a remaining gas fraction not permeated through the gas separating membrane and having a decreased content of water vapor is recovered from the feed side of the gas separating device.

8 Claims, 2 Drawing Figures

METHOD FOR REMOVING WATER VAPOR FROM WATER VAPOR-CONTAINING GAS

BACKGROUND OF THE INVENTION

1. Field of the Invention

The present invention relates to a method for removing water vapor from a water vapor-containing gas. More particularly, the present invention relates to a method for selectively removing water vapor from various water-containing mixed gases, for example, air, natural gas, mixed gases accompanying crude oil production, and fermentation gases, by means of a gas separating membrane which has a high separating selectivity for water vapor and may be in the form of a hollow-filament, a spiral film or a flat film, and preferably comprises an aromatic imide polymer.

2. Description of the Related Art

It is known that water vapor can be removed from water vapor-containing mixed hydrocarbon gas, for example, natural gas by a glycol absorption method or molecular sieve adsorption method.

However, the above-mentioned known methods are disadvantageous in that they necessitate the use of large equipment, with the inevitable high costs and need for a large installation space, and thus, are not satisfactory for undersea crude gas production in which the operation space is very restricted. Additional problems are those of the complicated operation, operational safety and maintenance of such equipment.

In place of the above-mentioned adsorption methods several new methods, which are carried out by a small size, light weight apparatus which is easily maintained and operated under enhanced safety conditions, have been developed. In those new methods, water vapor is removed from various water vapor-containing mixed gases by means of a gas separating module containing at least one gas separating membrane therein.

The water vapor removing methods utilizing the gas separating membrane include, for example, the following methods.

(a) Japanese Unexamined Patent Publication No. 54-152679 discloses a water vapor-removing method wherein a water vapor-containing mixed gas is fed at a feed side of a gas separating module, under a very high pressure at the feed side or under a reduced pressure at the delivery side of the gas separating module, so that there is a large difference in pressure between the feed side and the delivery side of the gas separating module.

(b) Japanese Unexamined Patent Publication No. 59-193835 discloses a water vapor-removing method for various water vapor-containing mixed gases containing, as a major component, a gas having a high permeability, for example, natural gas containing, as a major component, methane gas, in which method a gas separating membrane has a ratio ($P_{H_2O}/P_{CH_4}$) of a water vapor-permeating rate ($P_{H_2O}$) to a methane gas-permeating rate ($P_{CH_4}$) of 200 to 400.

(c) Japanese Unexamined Patent Publication (Kokai) No. 50-2674 discloses a water vapor-removing method in which a large amount of a purge gas is fed in a delivery side of a gas separating membrane so as to decrease the partial pressure of water vapor permeated through the gas separating membrane and to promote the permeation of the water vapor.

In the known method (a), the resultant gas fraction permeated through the gas separating membrane sometimes has a high content of water vapor at the delivery side of the gas separating module, especially in an outlet region for the permeated gas fraction. This phenomenon causes the water vapor-removing efficiency to be decreased. Accordingly, the known method (a) is not satisfactory for practical use.

In the known method (b), it is difficult to obtain a satisfactory gas separating membrane for this method. Also, the method (b) is disadvantageous in that a large amount of the valuable component of the water vapor-containing mixed gas to be recovered is lost, and therefore, the recovery efficiency of the valuable component is poor.

The known method (c) is disadvantageous in that a very large amount of the purge gas is consumed.

SUMMARY OF THE INVENTION

An object of the present invention is to provide a method for removing water vapor from a water vapor-containing feed gas at a high efficiency and at a low cost.

Another object of the present invention is to provide a method for removing water vapor from a water vapor-containing feed gas without a large loss of a valuable component in the feed gas.

The above-mentioned objects are attained by the method of the present invention which is carried out by means of a gas separating device comprising at least one gas separating membrane having a gas feed surface and a gas delivery surface thereof, exhibiting a ratio ($P_{H_2O}/P_{CH_4}$) of a permeating rate of water vapor ($P_{H_2O}$) to a permeating rate of methane ($P_{CH_4}$) of 200 or more and contained in a gas tightly closed container, comprising the steps of:

feeding a water vapor-containing feed gas to a feed side of the gas separating device;

flowing the fed feed gas along the gas feed surface of the gas separating membrane to allow a fraction of the feed gas to permeate through the gas separating membrane;

feeding a drying gas containing water vapor in a restricted amount of 300 ppm or less to a delivery side of the gas separating device;

flowing the fed drying gas along the delivery surface of the gas separating membrane to promote the permeation of water vapor through the gas separating membrane;

collecting a gas fraction permeated through the gas separating membrane and having an increased content of water vapor, together with the flowed drying gas at the delivery side of the gas separating device; and recovering a gas fraction not permeated through the gas separating membrane and having a decreased content of water vapor from the feed side of the gas separating device.

In the process of the present invention, the gas separating membrane has a high selectivity for separating water vapor from the water vapor-containing feed gas. Also, the flowing of the drying gas having a very low content of water vapor along the gas delivery surface of the gas separating membrane is highly effective for removing water vapor absorbed in and on the gas separating membrane and for promoting the permeation of water vapor through the gas permeating membrane.

DESCRIPTION OF THE PREFERRED EMBODIMENTS

The method of the present invention is carried out by utilizing a gas separating device comprising at least one gas separating membrane contained in a closed gas-tight container. The gas separating membrane has a feed surface and a delivery surface thereof and exhibits a high ratio ($P_{H_2O}/P_{CH_4}$) of water vapor permeating rate ($P_{H_2O}$) to methane gas permeating rate ($P_{CH_4}$) of 200 or more, preferably 400 or more, more preferably 500 to 50,000. If the water vapor selectivity ratio ($P_{H_2O}/P_{CH_4}$) in less than 200, the gas separating membrane exhibits an unsatisfactory water vapor-removing effect.

The gas separating membrane usable for the method of the present invention preferably has a water vapor-permeating rate of $1 \times 10^{-5}$ cm$^3$/cm$^2$·sec·cmHg or more, more preferably $1 \times 10^{-4}$ to $5 \times 10^{-2}$ cm$^3$/cm$^2$·sec·cmHg, at a temperature of 25° C.

The gas separating membrane preferably comprises an aromatic imide polymer and is preferably in the form of a hollow filament, a spiral film or a flat film.

Figure 1:
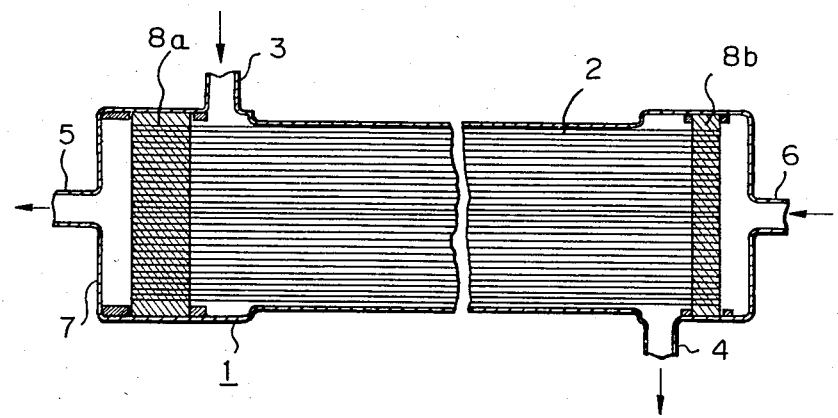
FIG. 1 is a cross sectional view of an embodiment of the gas separating device usable for the method of the present invention; and, FIG. 2 shows an explanatory flow system for carrying out the method of the present invention, in which a non-permeated gas fraction recovered from a feed side of a gas separating device is recycled to a delivery side of the gas separating device to be utilized as a drying gas for a permeated gas fraction.

Referring to FIG. 1, a gas separating device 1 is composed of a number of gas separating hollow filaments 2 arranged in parallel to and spaced from each other so as to form gaps between the hollow filaments and a gas-tight container 7 containing therein the gas separating hollow filaments 2. The container 7 is provided with an inlet 3 for a water vapor-containing feed gas connected to feed surfaces (outside surfaces) of the gas separating hollow filaments, an outlet 4 for a non-permeated gas fraction connected to the feed surfaces of the gas separating hollow filaments, an outlet 5 for a permeated gas fraction connected to the delivery surfaces (inside surfaces) of the gas separating hollow filaments, and an inlet 6 for a drying gas connected to the delivery surfaces of the gas separating hollow filaments.

The large number of gas separating hollow filaments are bundled by filling gaps among end portions of the hollow filaments with a gas-tight thermosetting resin selected from, for example, thermosetting elastomer resins, acrylic resins, epoxy resins, and phenolformaldehyde resins to form gas sealing walls 8a and 8b. The gas sealing walls 8a and 8b seal the spaces between middle portions of the hollow-filaments 2 from the drying gas inlet 6 and the permeated gas fraction outlet 5. The spaces are connected only to the water vapor-containing gas inlet 3 and the non-permeated gas fraction outlet 4.

The hollows of the hollow filaments 2 and connected only to the permeated gas fraction outlet 5 and the drying gas inlet 6 and are sealed from the water vapor-containing feed gas inlet 3 and the non-permeated gas fraction outlet 4 by the gas sealing walls 8a and 8b.

The gas sealing walls 8a and 8b are fixed to the inside wall surface of the container 7 by, for example, an adhesive.

In the process of the present invention, referring to FIG. 1, a water vapor-containing gas is fed into the gas separating device 1 through the inlet 3 and flows along the gas feed surfaces (outside surfaces) of the gas separating hollow filaments 2 so as to allow a fraction of the feed gas to permeate from the gas feed surfaces to the gas delivery surfaces of the gas separating hollow filaments 2. The gas fraction permeated through the hollow filaments 2 and having an increased content of water vapor flows through the hollows of the hollow filaments 2 toward the outlet 5. In this operation, a drying gas is fed into the delivery side of the gas-separating device 1 through the inlet 6, flows through the hollows of the hollow filaments, and is then delivered together with the permeated gas fraction through the outlet 5.

The remaining gas fraction, which has not been permeated through the hollow filaments 2, has a decreased content of water vapor. The non-permeated gas fraction flows through gaps formed between the middle portions of the hollow filaments, that is, along the gas feed outside surfaces of the hollow filaments, and then is collected through the outlet 4.

A portion of the collected non-permeated gas fraction can be utilized as a drying gas.

Figure 2:
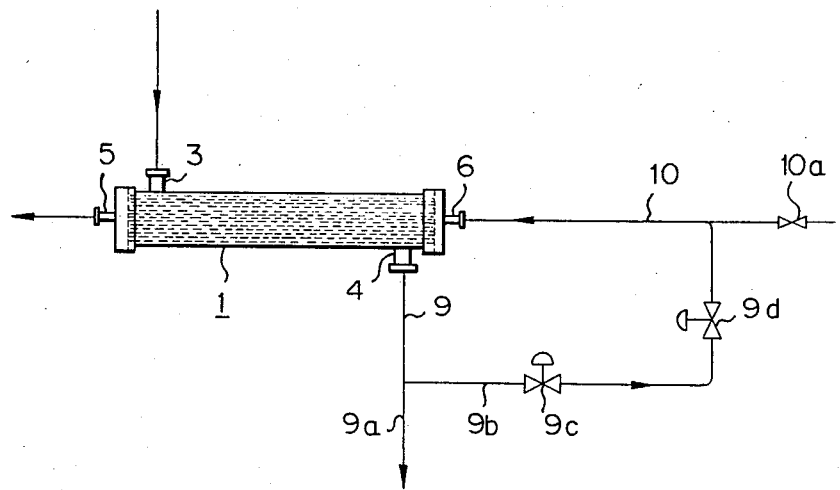

Referring to FIG. 2, the non-permeated gas fraction is withdrawn from the gas separating device 1 through an outlet 4 and a conduit 9. A portion of the withdrawn gas fraction is delivered to the outside of the water vapor-removing system through a conduit 9a and the remaining portion of the withdrawn gas fraction is supplied to a conduit 9b. When valves 9c and 9d are opened and a valve 10a is closed, the remaining portion of the withdrawn gas fraction is supplied to a conduit 10 and then fed, as a drying gas, to the gas separating device 1 through the inlet 6.

In the gas separating device usable for the process of the present invention, the gas separating membrane is preferably made from an aromatic imide polymer having a ratio $P_{H_2O}/P_{CH_4}$ of 200 or more.

The aromatic imide polymer is a polymerization-imidization product of an aromatic tetracarboxylic acid component with an aromatic diamine component.

The gas separating aromatic imide polymer membrane can be produced by producing an aromatic polyamic acid or an aromatic imide polymer from the aromatic tetracarboxylic acid component and the aromatic diamine component, by preparing a precursory article consisting of a solution of the aromatic polyamic acid or aromatic imide polymer in a solvent and having a desired form, and by solidifying the precursory article by removing the solvent therefrom.

The solidification of the precursory article can be effected by a coagulating method in which the precursory article is immersed in a coagulating liquid. This coagulating method causes the resultant coagulated membrane to have an asymmetric structure in density. That is, the coagulated membrane has a dense layer portion and a porous layer portion thereof.

The gas separating membrane can be produced by evaporating the solvent from the precursory article at an elevated temperature or under a reduced pressure.

Alternatively, the gas separating membrane can be produced by coating a substrate consisting of a porous material with a solution of the aromatic polyamic acid or the aromatic imide polymer to form a thin layer of the solution and by solidifying the thin layer of the solution to form a composite membrane consisting of a porous substrate and a dense coating layer of the polymer.

In the preparation of the aromatic imide polymer, the aromatic diamine component preferably contains 20 to 100 molar %, more preferably 40 to 100 molar %, of at least one aromatic diamine compound having at least one divalent radical selected from the group consisting of —S— and —SO$_2$— radicals, and the aromatic tetracarboxylic acid component preferably contains 50 to 100 molar %, more preferably 80 to 100 molar %, of at least one member selected from biphenyl tetracarboxylic acids, benzophenone tetracarboxylic acids, pyromellitic acid, preferably biphenyl tetracarboxylic acids, and dianhydrides, and esters of the above-mentioned acids. The above-mentioned specific aromatic tetracarboxylic acid component and diamine components are usually polymerized in equimolar amounts.

The aromatic imide polymer obtained from the above-mentioned specific aromatic tetracarboxylic acid component and diamine component exhibits a high solubility in an organic polar solvent, for example, phenol compounds, and is easily converted to a membrane-forming dope solution. Also, this type of aromatic imide polymer exhibits a satisfactory membrane-forming property and is useful for producing a gas separating membrane having a high water vapor-permeating rate. The resultant gas separating membrane exhibits a high water vapor-removing efficiency.

The aromatic diamine compound having at least one divalent —S— or —SO$_2$— radical are selected from, for example, diamino-dibenzothiophene, diamino-diphenylene sulfone, diamino-diphenylsulfide, diamino-diphenyl sulfone, diamino-thioxanthene, and amide-forming derivatives of the above-mentioned compounds. The diamino-dibenzothiophenes and derivatives thereof include a diamino-dibenzothiophene compound of the general formula (I):

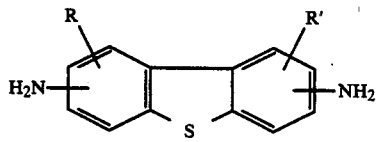

The diamino-diphenylene sulfones and derivatives include diamino-diphenylene sulfone compounds of the general formula (II):

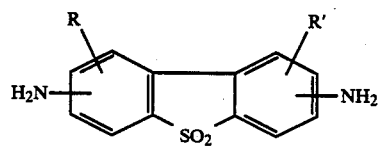

In the formulae (I) and (II), R and R' represent a member selected from the group consisting of a hydrogen atom, hydrocarbon radicals having 1 to 6 carbon atoms, and alkoxyl radicals having 1 to 6 carbon atoms, respectively. The hydrocarbon radical is preferably selected from alkyl, alkylene, and aryl radicals, especially from methyl, ethyl, and propyl radicals.

The diamino-dibenzothiophene and derivatives thereof include 3,7-diamino-2,8-dimethyldibenzothiophene, 3,7-diamino-2,6-dimethyldibenzothiophene, 2,8-diamino-3,7-dimethyldibenzothiophene, and 3,7-diamino-2,8-diethyldibenzothiophene.

The diamino-diphenylene sulfone and derivatives thereof include 3,7-diamino-2,8-dimethyldiphenylene sulfone, 3,7-diamino-2,8-diethyldiphenylene sulfone, 3,7-diamino-2,8-dipropyldiphenylene sulfone, 2,8-diamino-3,7-dimethyldiphenylene sulfone, and 3,7-diamino-2,8-dimethoxydiphenylene sulfone.

The diamino-diphenyl sulfide and derivatives thereof include 4,4'-diamino-diphenylsulfone, 3,3'-diphenylsulfone, 3,5-diamino-diphenylsulfone, 3,4'-diamino-diphenylsulfone, 4,4'-diamino-diphenylsulfide, 3,3'-diamino-diphenylsulfide, 3,5-diamino-diphenylsulfide, and 3,4'-diamino-diphenylsulfide.

The diamino-thioxanthene and derivatives thereof include 3,7-diamino-thioxanthene-5,5-dioxide, 2,8-diamino-thioxanthene-5,5-dioxide, 3,7-diamino-thioxanthene-5,5-dioxide, 2,8-diamino-thioxanthone-5,5-dioxide, 3,7-diamino-phenoxathine-5,5-dioxide, 2,8-diamino-phenoxathine-5,5-dioxide, 2,7-diamino-thianthrene, 2,8-diamino-thianthrene, and 3,7-diamino-10-methylphenothiazine-5,5-dioxide.

The aromatic diamine compound having the divalent —S— or —SO$_2$— radical further includes bis[(p-aminophenoxy)phenyl]sulfide and bis[(p-aminophenoxy)phenyl]sulfone.

The aromatic diamine component may contain, in addition to the above-mentioned aromatic diamine compounds containing at least one divalent —S— or —SO$_2$— radical, at least one other aromatic diamine compound, selected from, for example, the group consisting of diaminodiphenylether compounds, for example, 4,4'-diaminodiphenylether, 3,3'-dimethyl-4,4'-diaminodiphenylether, 3,3'-diethoxy-4,4'-diaminodiphenylether, 3,3'-diaminodiphenylether; diaminodiphenyl-methane compounds, for example, 4,4'-diaminodiphenyl-methane, and 3,3'-diaminodiphenylmethane; diaminobenzophenone-compounds, for example, 4,4'-diaminobenzophenone and 3,3'-diaminobenzophenone; bis(aminophenyl)propane compounds, for example, 2,2-bis(3-aminophenyl)propane, 2,2-bis(4-aminophenyl)propane, and 2,2-bis[4(4'-aminophenoxy)phenyl]propane; o, m and p-phenylene diamines, 3,5-diaminobenzoic acid, 2,6-diaminopyridine, and o-tolidine.

The biphenyltetracarboxylic acids include 3,3',4,4'-biphenyltetracarboxylic acid and 2,3,3',4'-biphenyltetracarboxylic acid. The benzophenone tetracarboxylic acids include 3,3',4,4'-benzophenone tetracarboxylic acid and 2,3,3',4'-benzophenone tetracarboxylic acid.

The gas separating membrane usable for the method of the present invention is prepared from a dope solution containing an aromatic imide polymer of the corresponding aromatic polyamic acid, which is a precursor of the aromatic imide polymer, dissolved in an organic solvent in such a manner that the dope solution is shaped into a desired form, for example, a hollow filament, a flat film or a spiral film, and the shaped dope solution is solidified by a dry membrane-forming method in which the solvent is evaporated in a drying manner, or by a wet membrane-forming method wherein the shaped dope solution is brought into contact with a coagulating liquid to remove the solvent. When a dope solution containing the aromatic polyamic acid is used, in any step in the membrane-forming method, the aromatic polyamic acid is imidized to the corresponding aromatic imide polymer.

For example, the aromatic tetracarboxylic acid component and the aromatic diamine component in equimolar amounts are subjected to a one step polymerization-imidization process in an organic solvent consisting of at least one phenol compound at a temperature of about 140° C. or more. The resultant aromatic imide polymer solution from the polymerization-imidization process is used as a dope solution which usually contains 3 to 30% by weight of the aromatic imide polymer.

The dope solution is extruded to form a number of hollow filamentary streams of the dope solution or is spread on a surface of a substrate to form a thin layer of the dope solution at an atmospheric temperature of 30° to 150° C. The hollow filamentary stream or thin layer of the dope solution is introduced into a coagulating liquid consisting of, for example, water and ethyl alcohol. The coagulated hollow filaments or thin layer are dried to remove residues of the solvent and the coagulating liquid by evaporation, and then heat treated at a temperature of 150° C. to 400° C., preferably, 170° C. to 350° C. The density of the resultant membrane is asymmetric, that is, it has a dense layer portion and a porous layer portion.

In the method of the present invention, the water vapor-containing feed gas preferably contains water vapor in a high content corresponding to 70% to 100% of the saturated water vapor content in the feed gas at a temperature under a pressure applied to the water vapor-removing procedures. The feed gas may be natural gas, mixed hydrocarbon gas, or oil gas containing a high content of water vapor.

The drying gas usable for the method of the present invention contains water vapor in a restricted content of 300 ppm or less, preferably, 200 ppm or less, still more preferably, 100 ppm or less. The drying gas may consist of at least one inert gas selected from nitrogen argon and neon gases, or a mixed gas having the same composition as that the feed gas except that the content of water vapor is restricted as stated above. Otherwise, the drying gas may consist of the non-permeated gas fraction recycled from the gas separating device and having a decreased content of water vapor.

The drying gas is fed in an amount of 10%, or less, preferably 0.5% to 8%, based on the volume of the water vapor-containing feed gas to the delivery side of the gas separating device, is flowed along the gas delivery surface of the gas separating membrane, and is then delivered, together with the permeated gas fraction having an increased content of water vapor, from the delivery side of the gas separating device.

If the feed amount of the drying gas is more than 10% based on the volume of the water vapor-containing feed gas, the efficiency of the removed water vapor does not increase with the increase of the feed amount of the drying gas. That is, an excessive amount of the drying gas is consumed to no avail. If the feed amount of the drying gas is excessively small, the removal of water vapor from the feed gas is sometimes unsatisfactory. Therefore, the feed amount of the drying gas is preferably in the range of from 0.5 to 8% based on the volume of the water vapor-containing feed gas.

Also, it is preferable that the drying gas flow concurrently with the permeated gas fraction along the gas delivery surface of the gas separating membrane.

Furthermore, it is preferable that the flow of the drying gas along the gas delivery surface of the gas separating membrane run countercurrent to the flow of the water vapor-containing feed gas along the gas feed surface of the gas separating membrane.

Preferably, the drying gas is fed at a flow speed of 0.1 to 10 m/sec, more preferably 0.5 to 8 m/sec.

In the process of the present invention, the efficiency of the removal of water vapor from the water vapor-containing feed gas can be widely controlled by controlling the presence of the feed gas, the feed rate of the drying gas, and the pressure of the permeated gas fraction. Usually, it is preferable that the pressure of the water vapor-containing feed gas be 5 kg/cm$^2$ or more, more preferably 10 to 100 kg/cm$^2$, and the pressure of the permeated gas fraction be similar to atmospheric air pressure.

Preferably, the water vapor-containing feed gas is fed at a feed rate, with respect to the effective surface area of the gas feed surface of the gas separating membrane, in the range of from 0.05 to 100 cm$^3$/cm$^2$·sec, more preferably 0.1 to 10 cm$^3$/cm$^2$·sec.

The present invention will be further explained by way of specific examples, which, however, are merely representative and do not restrict the scope of the present invention in any way.

In the examples, the water vapor-removing procedures were carried out by means of the gas separating device as shown in FIG. 1, containing a large number of hollow aromatic imide polymer filaments arranged in parallel to each other and spaced from each other to form gaps between the hollow filaments.

A water vapor-containing feed gas was fed under a feed gauge pressure of 6 to 52 kg/cm$^2$·G at a temperature of 25° C. to the feed side of the gas separating device and flowed along the outside surface of the hollow filaments. Also, a drying gas was fed to the delivery side of the gas separating device and made to flow through the hollows of the hollow filaments.

The amounts and compositions of the resultant permeated gas fraction and non-permeated gas fractions were measured in accordance with usual gas-chromatography. Especially, the contents of water vapor in the feed gas, in the permeated gas fraction, and in the non-permeated gas fraction were determined by means of a hygrometer (Type 303, made by Du Pont).

EXAMPLES 1 TO 3

In each of Examples 1 to 3, a hollow aromatic imide polymer filament A was produced from an aromatic imide polymer which was a polymerization-imidization product of 100 parts by weight of biphenyltetracarboxylic dianhydride with 80 parts by weight of a mixture of diamino-dimethyldiphenylene sulfone isomers and 20 parts by weight of 2,6-diaminopyridine, in a usual manner.

The hollow filament was placed in the gas separating device and fixed by gas sealing epoxy resin walls as shown in FIG. 1. The hollow filament had an effective length of 5.6 cm, an outside diameter of 305 μm, an inside diameter of 90 μm, and an effective gas feed surface area of 0.54 cm$^2$. The hollow filament exhibited a water vapor-permeating rate of $6.5 \times 10^{-4}$ cm$^3$/cm$^2$·sec·cmHg, determined at a temperature of 25° C.

A feed gas comprising, as a main component, methane, and having a water vapor content as shown in Table 1, was fed to the feed side of the gas separating device under a gauge pressure of 52 kg/cm$^2$·G, at a temperature of about 25° C., and at a flow speed as indicated in Table 1. The feed gas was made to flow along the outside surface (gas feed surface) of the hollow filament.

A drying gas comprising dried argon gas and containing water vapor in a restricted amount of about 10 ppm as indicated in Table 1 was fed to the delivery side of the gas separating device at a flow speed indicated in Table 1 and was made to flow along the inside surface (gas delivery surface) of the hollow filament.

A gas fraction permeated through the hollow filament was collected, together with the flowed drying gas, from the delivery side of the gas separating device under a pressure similar to the atmospheric air pressure. The remaining gas fraction, which had not been permeated through the hollow filament and had a decreased water vapor content as indicated in Table 1, was collected from the feed side of the gas separating device.

The compositions and flow rates of the feed gas, drying gas, permeated gas fraction, and non-permeated gas fraction are shown in Table 1.

COMPARATIVE EXAMPLE 1

The same procedures as those described in Example 1 were carried out except that the drying gas was not used.

The results are shown in Table 1.

EXAMPLES 4 AND 5

In each of Examples 4 and 5, an aromatic imide polymer hollow filament B was produced from a polymerization-imidization product of 90 parts by weight of 3,3',4,4'-biphenyltetracarboxylic dianhydride and 10 parts by weight of pyromellitic dianhydride with 90 parts by weight of a mixture of diamino-dimethyldiphenylene sulfone isomers and 10 parts by weight of 4,4'-diaminodiphenylether.

The hollow filament was arranged, as a gas separating membrane, in the gas separating device and was fixed with an epoxy resin.

The fixed hollow filament had an effective length of 5.15 nm, an outside diameter of 434 $\mu$m, an inside diameter of 190 $\mu$m, and an effective gas feed surface area of 0.70 cm$^2$, and exhibited a water vapor-permeating rate of $7.4 \times 10^{-4}$ cm$^3$/cm$^2$·sec·cmHg at a temperature of 25° C. The same water vapor-removing procedures as those described in Example 1 were carried out by using the gas separating device containing the above-mentioned hollow filament under the conditions indicated in Table 1.

The results are also shown in Table 1.

COMPARATIVE EXAMPLE 2

The same procedures as those described in Example 4 were carried out except that a drying gas was not used. The results are shown in Table 1.

EXAMPLES 6 AND 7

In each of Examples 6 and 7, the same procedures as those described in Example 4 were carried out by means of the same gas-separating device as that mentioned in Example 4, except that the hollow filament arranged in the gas separating device had an effective length of 11.0 cm and an effective gas feed surface area of 1.50 cm$^2$. The process conditions were as shown in Table 1. The feed gauge pressure of the water vapor-containing feed gas was 6 kg/cm$^2$·G.

The results are shown in Table 1.

COMPARATIVE EXAMPLE 3

The same procedures as those described in Example 6 were carried out except that a drying gas was not used.
The results are shown in Table 1.

EXAMPLES 8 TO 10

In each of Examples 8 to 10, a number of aromatic imide polymer hollow filaments C were produced from a polymerization-imidization product of 100 parts by weight of 3,3',4,4'-biphenyltetracarboxylic dianhydride with 80 parts by weight of a mixture of diaminodimethyldiphenylene sulfone isomers and 20 parts by weight of 2,6-diaminopyridine.

A gas separating device of the same type as that shown in FIG. 1 contained a bundle consisting of 30 hollow filaments C arranged in parallel to each other and spaced from each other to form gaps therebetween.

The hollow filaments C were fixed to the gas separating device by gas sealing walls made of an epoxy resin.

The hollow filaments arranged in the gas separating device has an effective length of 25.3 cm, an outside diameter of 454 $\mu$m, an inside diameter of 230 $\mu$m, and an entire effective gas feed surface area of 108 cm$^2$.

The same water vapor-removing procedures as those described in Example 1 were carried out under conditions as indicated in Table 1. The water vapor-containing feed gas was fed under a feed gauge pressure of 50 kg/cm$^2$·G, and the permeated gas fraction and the non-permeated gas fraction were collected under atmospheric air pressure, respectively.

The results are shown in Table 1.

COMPARATIVE EXAMPLE 4

The same procedures as those described in Example 8 were carried out except that a drying gas was not used.
The results are indicated in Table 1.

EXAMPLES 11 AND 12

In each of Examples 11 and 12, a plurality of hollow filaments D were produced from 100 parts by weight of 3,3',4,4'-biphenyltetracarboxylic dianhydride and 100 parts by weight of a mixture of diaminodimethyldiphenylene sulfone isomers.

A bundle consisting of 6 hollow filaments was arranged in the gas separating device as shown in FIG. 1 so that the filaments were in parallel to each other, and were spaced from each other to form gaps therebetween, and the bundle was fixed to the device with an epoxy resin which formed gas sealing walls.

The hollow filaments arranged in the gas separating device had an effective length of about 4.1 cm, an outside diameter of 220 $\mu$m, an inside diameter of 130 $\mu$m, and an effective gas feed surface area of 1.70 cm$^2$, and exhibited a water vapor-permeating rate of $5.0 \times 10^{-4}$ cm$^3$/cm$^2$·sec·cmHg at a temperature of 25° C.

The same water vapor-removing procedures as those described in Example 1 were carried out under the conditions shown in Table 1. The feed gauge pressure of the water vapor-containing feed gas was 10 kg/cm$^2$·G. A portion of the non-permeated gas fraction was fed, as a drying gas, to the delivery side of the gas separating device through the conduit line as shown in FIG. 2.
The results are shown in Table 1.

COMPARATIVE EXAMPLE 5

The same procedures as those described in Example 11 were carried out except that a drying gas was not used.

The results are shown in Table 1.

TABLE 1

| Example | Item | Type of aromatic imide polymer hollow filament | Feed gas Feed rate (F) (cm³/sec) | Feed gas Water vapor content (ppm) | Drying gas Feed rate (P) (cm³/sec × 10⁻³) | Drying gas Water vapor content (ppm) | Ratio P/F (%) | Non-permeated gas fraction Delivery rate (cm³/sec) | Non-permeated gas fraction Water vapor content (ppm) | Permeated gas fraction Delivery rate (cm³/sec × 10⁻³) | Permeated gas fraction Water vapor content (ppm) | Removal of water vapor (%) |
|---|---|---|---|---|---|---|---|---|---|---|---|---|
| Example 1 | A | | 1.91 | 662 | 30 | 10 | 1.57 | 1.91 | 448 | 33 | 12400 | 32 |
| Example 2 | | | 2.00 | 635 | 83 | 10 | 4.15 | 2.00 | 359 | 86 | 6430 | 44 |
| Example 3 | | | 1.89 | 635 | 164 | 10 | 8.68 | 1.89 | 327 | 167 | 3500 | 49 |
| Comparative Example 1 | | | 2.00 | 635 | 0 | 0 | 0 | 2.00 | 610 | 0.2 | — | 4 |
| Example 4 | B | | 4.90 | 648 | 33 | 10 | 0.67 | 4.90 | 499 | 34 | 21516 | 23 |
| Example 5 | | | 4.95 | 545 | 168 | 10 | 3.39 | 4.95 | 373 | 169 | 5056 | 37 |
| Comparative Example 2 | | | 4.95 | 550 | 0 | 0 | 0 | 4.95 | 539 | 0.1 | — | 2 |
| Example 6 | B | | 5.12 | 643 | 176 | 10 | 3.20 | 5.12 | 541 | 177 | 2970 | 16 |
| Example 7 | | | 4.95 | 662 | 492 | 10 | 9.94 | 4.95 | 512 | 493 | 1519 | 23 |
| Comparative Example 3 | | | 4.90 | 666 | 0 | 0 | 0 | 4.90 | 646 | 0.1 | — | 3 |
| Example 8 | C | | 115 | 650 | 1,360 | 10 | 1.18 | 115 | 344 | 1,630 | 21592 | 47 |
| Example 9 | | | 115 | 693 | 5,470 | 10 | 4.76 | 115 | 147 | 5,810 | 10814 | 79 |
| Example 10 | | | 115 | 700 | 11,360 | 10 | 9.88 | 115 | 125 | 11,740 | 5647 | 82 |
| Comparative Example 4 | | | 120 | 603 | 0 | 0 | 0 | 120 | 582 | 290 | 8787 | 3 |
| Example 11 | D | | 0.96 | 1412 | 37 | 1080 | 3.85 | 0.96 | 1080 | 37 | 9698 | 24 |
| Example 12 | | | 0.96 | 1409 | 79 | 858 | 8.23 | 0.96 | 858 | 80 | 7461 | 39 |
| Comparative Example 5 | | | 0.96 | 1436 | 0 | 0 | 0 | 0.96 | 1393 | 0 | — | 3 |

We claim:

1. A method for removing water vapor from a water vapor-containing feed gas by means of a gas separating device comprising at least one gas separating membrane in the form of a hollow filament, comprising an aromatic imide polymer, having a gas feed surface and a gas delivery surface thereof, exhibiting a permeating rate of water vapor $P_{H2O}$ of $1 \times 10^{-5}$ cm³/cm²·sec·cmHg or more and a ratio $P_{H2O}/P_{CH4}$ of a permeating rate of water vapor $P_{H2O}$ to a permeating rate of methane $P_{CH4}$ of 200 or more, and contained in a closed gas tight container, comprising the steps of:

feeding a water vapor-containing feed gas to a feed side of the gas separating device, flowing the fed feed gas along the gas feed surface of the gas separating membrane to allow a fraction of the feed gas to permeate through the gas separating membrane, feeding a drying gas in an amount of 10% or less, based on the volume of the water vapor-containing feed gas, and containing water vapor in a restricted amount of 300 ppm or less to a delivery side of the gas separating device, flowing the fed drying gas along the delivery surface of the gas separating membrane to promote the permeation of water vapor through the gas separating membrane, collecting a gas fraction permeated through the gas separating membrane and having an increased content of water vapor, together with the flowed drying gas at the delivery side of the gas separating device, and recovering a gas fraction not permeated through the gas separating membrane and having a decreased content of water vapor from the feed side of the gas separating device.

2. The method as claimed in claim 1, wherein the gas separating membrane has a ratio $P_{H2O}/P_{CH4}$ of from 500 to 5,000.

3. The method as claimed in claim 1, wherein the aromatic imide polymer is a polymerization-imidization product of an aromatic tetracarboxylic acid component comprising 50 to 100 molar % of at least one member selected from biphenyl tetracarboxylic acids, and dianhydrides and esters of the above-mentioned acids with an aromatic diamine component comprising 20 to 100 molar % of at least one aromatic diamine compound having at least one divalent radical selected from the group consisting of —S— and —SO₂—.

4. The method as claimed in claim 1, wherein the gas separating membrane is asymmetric with respect to densities of the feed side portion and the delivery side portion thereof.

5. The process as claimed in claim 1, wherein the gas fraction recovered from the feed side of the gas separating device is recycled as the drying gas.

6. The process as claimed in claim 1, wherein the drying gas comprises at least one inert gas selected from nitrogen, argon and neon gases.

7. The process as claimed in claim 1, wherein the water vapor-containing feed gas is fed under a pressure of 5 kg/cm² or more and the permeated gas fraction is delivered under an atmospheric air pressure.

8. The process as claimed in claim 1, wherein the water vapor-containing feed gas is fed at a feeding rate of 0.05 to 100 cm³/cm²·sec.

* * * * *